No. 667,539. Patented Feb. 5, 1901.
J. J. LENTZ.
AUTOMATIC RELEASING DEVICE.
(Application filed Nov. 7, 1900.)
(No Model.) 2 Sheets—Sheet 1.
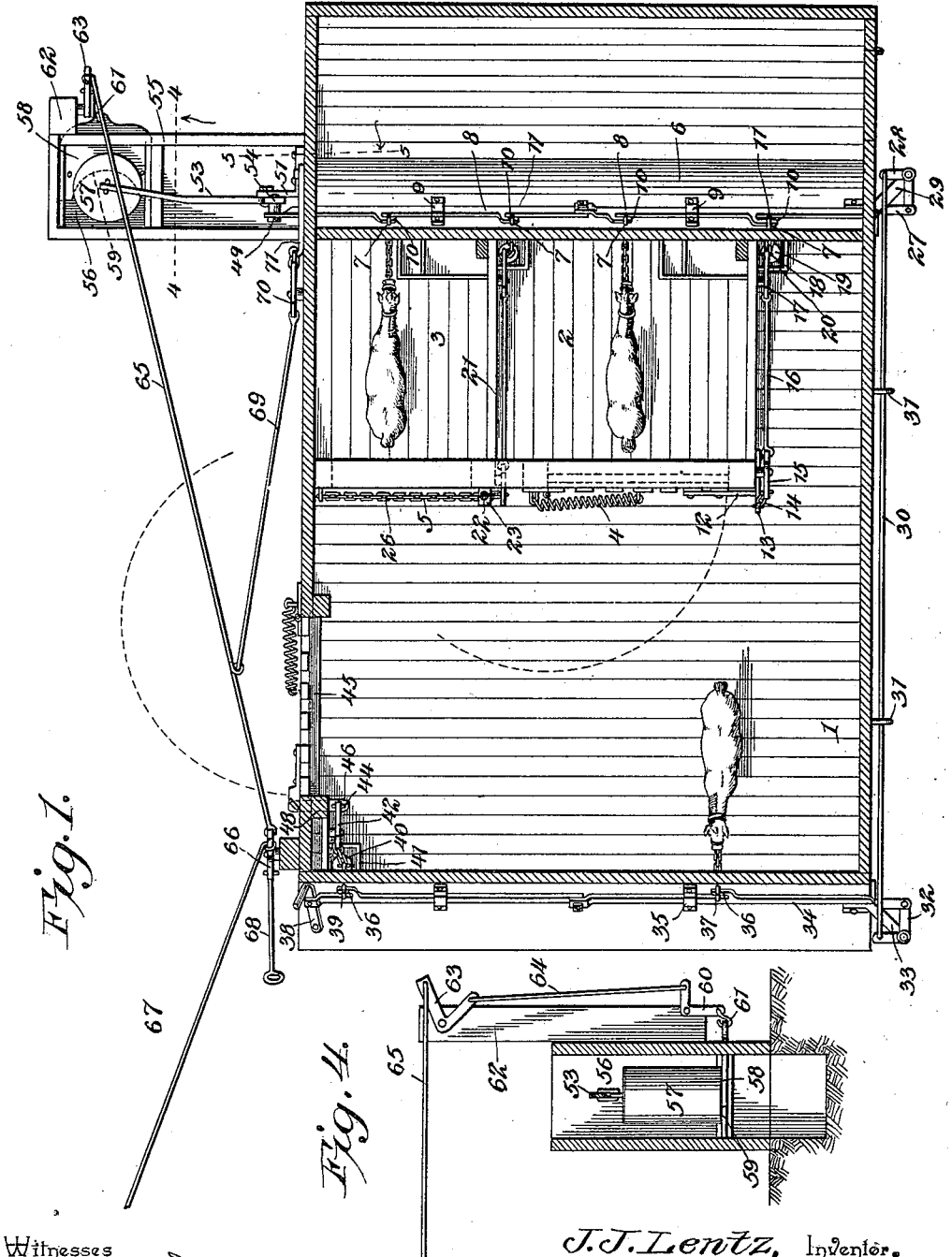
Witnesses
Howard D. Orr.
Chas. S. Hyer.
J. J. Lentz, Inventor.
By C. A. Snow & Co.
Attorneys No. 667,539. Patented Feb. 5, 1901.
J. J. LENTZ.
AUTOMATIC RELEASING DEVICE.
(Application filed Nov. 7, 1900.)
(No Model.) 2 Sheets—Sheet 2.
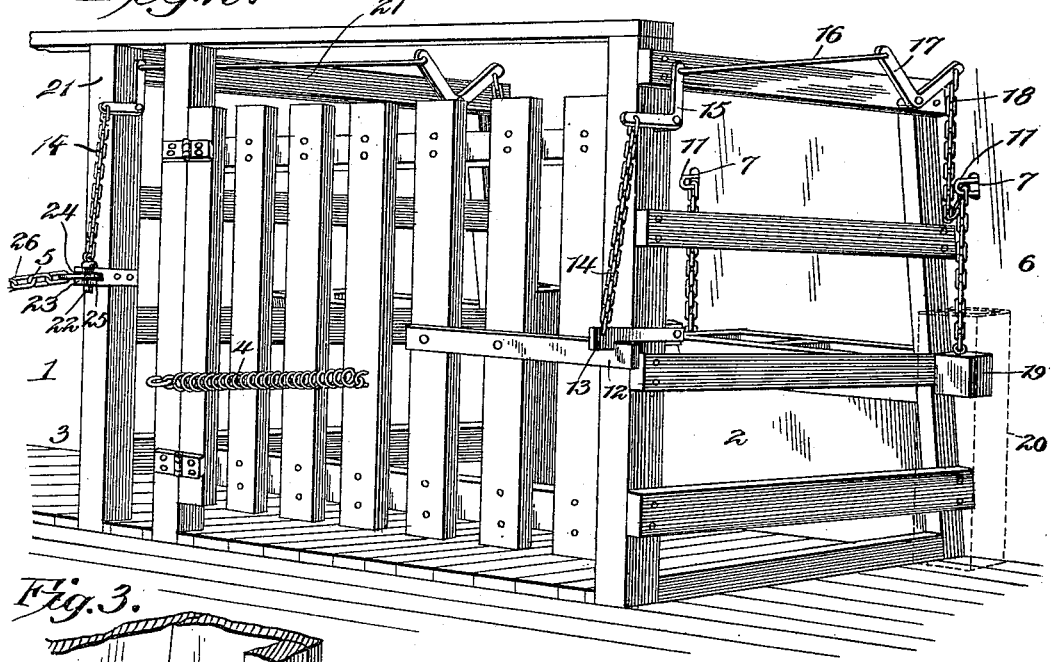
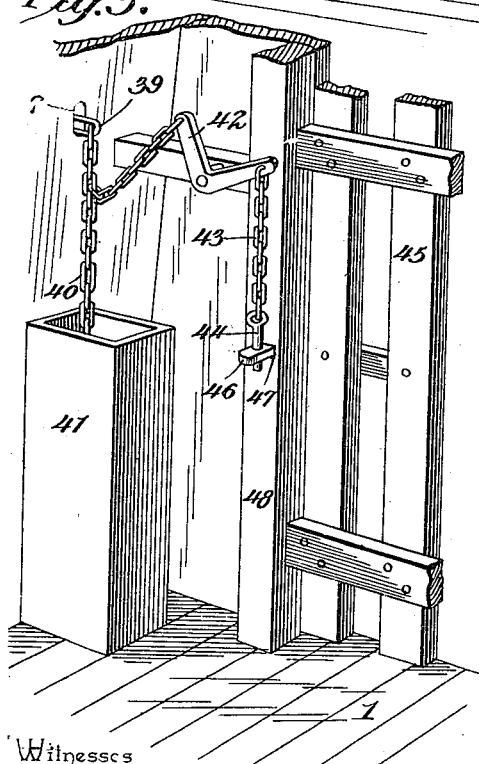
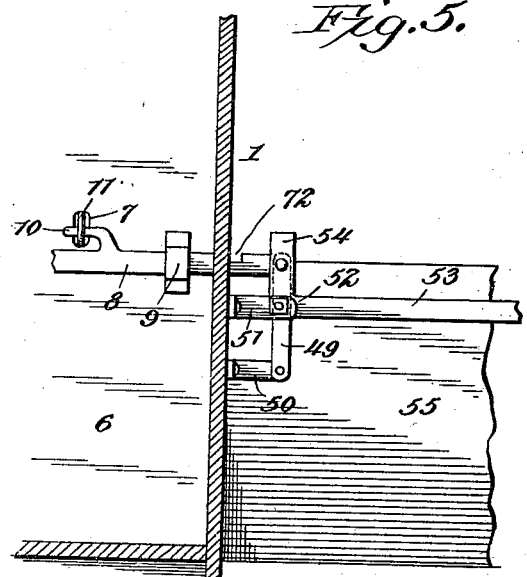
Witnesses
Howard D. Orr.
Chas. S. Hyer.
J. J. Lentz, Inventor.
By C. A. Snow & Co.
Attorneys

UNITED STATES PATENT OFFICE.

JOHN J. LENTZ, OF ALLENTOWN, PENNSYLVANIA.

AUTOMATIC RELEASING DEVICE.

SPECIFICATION forming part of Letters Patent No. 667,539, dated February 5, 1901.

Application filed November 7, 1900. Serial No. 35,735. (No model.)

*To all whom it may concern:*

Be it known that I, JOHN J. LENTZ, a citizen of the United States, residing at Allentown, in the county of Lehigh and State of Pennsylvania, have invented a new and useful Automatic Releasing Device, of which the following is a specification.

This invention relates to certain new and useful improvements in devices for simultaneously releasing horses or other animals confined in a stable or the like in the event of fire or other similar emergency; and the object of the same is to provide simple and effective means operative from one point for detaching or loosening the halter-straps, chains, or ropes of horses or other animals and to open stall gates or barriers and stable-doors without requiring an attendant to enter the stable or inclosure to effect such operation, and thereby facilitate the removal of horses or other animals from a burning building or allow them to be freed for escape from other danger or impending injury.

The invention consists in the construction and arrangement of the several parts which will be more fully hereinafter described and claimed.

In the drawings, Figure 1 is a horizontal section of a stable or barn, showing the improved devices arranged in operative relation thereto. Fig. 2 is a perspective view of a box-stall arrangement, showing an automatically-operated gate in one portion and a portion of a barrier for closing another part. Fig. 3 is a detail perspective view of a portion of the stable or inclosure, showing the means for releasing the gate or door forming the outlet and inlet therefor. Fig. 4 is a section on the line 4 4, Fig. 1. Fig. 5 is a section on the line 5 5, Fig. 1, on an enlarged scale.

Similar numerals of reference are employed to indicate corresponding parts in the several views.

The numeral 1 designates a barn, stable, or the like of any preferred or approved construction and including in this instance two box-stalls 2 and 3, it being understood that as many of the latter may be employed as found necessary or desirable and that any kind of stall or partitional inclosure is adapted to be supplied with the automatically-operating features, which will be more fully hereinafter described and claimed. The stall 2 is shown provided with a hinged gate supplied with a spring for automatically opening the same, as at 4, and the stall 3 has a chain barrier 5. In front of the stalls is a suitable alley-way, to which access may be had by any suitable means, preferably a door, as shown, and between the stalls and said alley-way is an inclined partition 6, having longitudinally-alined slots 7 formed therein at regular intervals, and in operative adjacency to said slots is a slide-bar 8, movable in guides 9 and formed or provided with hooks 10 along the upper edge thereof, which are shiftable across the said slots. Through a portion of the said slots the terminal links or analogous devices 11 of halter straps, chains, or ropes are adapted to be passed and engaged by a part of the said hooks 10, the said straps, chains, or ropes being suitably connected to the halters of the animals within the stalls in such manner that when the slide-bar is moved to disconnect the hooks 10 the animals will be released and free to walk out of or escape from the stalls. The spring-actuated gate of the one stall, as clearly shown by Fig. 2, is provided with a latch-bar 12, which is engaged by a pivotally-mounted gravitating latch 13, having a pull-chain or analogous device 14 attached to the free end thereof and extending upwardly to the lower arm of a bell-crank lever 15, movably mounted on the upper end portion of the stall, and from the upper arm of said lever a connecting-rod 16 runs to the one arm of another bell-crank lever 17, the latter having a depending chain 18 attached to its other arm and carrying a weight 19 on its lower end and also intermediately attached to one of the said links 11. Both of the bell-crank levers are pivotally mounted on the upper portion of the one end of the stall 2, and the weight 19 is confined in an upright inclosure or box 20, as shown by dotted lines, and from the foregoing structure the operation will be obvious, and as soon as the slide-bar 8 is shifted to disengage the hooks 10 from the link 11 on the chain 18 the weight 19 pulls down on the chain in falling and actuates the bell-crank levers 15 and 17 and the chain 14 to raise the latch 13 and permit the spring-actuated gate of the stall 2 to fly open.

On the partition-frame 21 between the two stalls 2 and 3 a mechanism precisely similar in all particulars to that just described is applied, and in this instance the pull-chain or analogous device 14 has a pin 22 attached thereto, having free movement into and from an outwardly-projecting keeper 23 with a bifurcated end 24, with which said pin engages and holds the terminal link 25 of a barrier-chain or like device 26 to retain the latter in closing position across the entrance to the stall 3, the opposite terminal of the chain or device 26 being secured permanently to the side of the barn, stable, or to any other suitable device. It will be seen from the foregoing description that as soon as the halter chains, straps, or ropes are released the gates or barriers of the stalls are simultaneously set free to clear the entrance to the said stalls, and this same arrangement may be carried out in a number of stalls and either the barriers or gates used alone or in combination, as shown.

The extremities of the slide-bar 8 movably project through the sides of the barn, stable, or inclosure, and one extremity 27 thereof is pivotally connected to one arm of a horizontally-disposed bell-crank lever 28, fulcrumed on a suitable supporting-bracket 29, and to the other arm of the said bell-crank lever 28 the one end of an operating bar or rod 30 is movably secured and moves in guides 31, fixed on the exterior of the inclosure, and at its opposite end also pivotally attached to the one arm of a bell-crank lever 32, fulcrumed on a bracket 33, secured to the inclosure. To the other arm of the bell-crank lever 32 the one end of an auxiliary slide-bar 34 is movably attached and shifts in guides 35, the upper edge of said bar also having hooks 36 to extend across slots in the end of the barn, stable, or inclosure similar to those heretofore referred to. Through one of the slots adjacent the slide-bar 34 the terminal link 37 of a halter chain, rope, or strap is passed for engagement with one of the hooks 36, and said latter halter chain, rope, or strap may be attached to the halter of a horse or other animal and be released in a manner similar to like devices heretofore set forth, thereby indicating that the releasing operation can be carried on at different points in the barn, stable, or other inclosure. To the end of the slide-bar 34 opposite that attached to the bell-crank lever 32 a manual shifting-lever 38 is attached and fulcrumed on the adjacent portion of the side of the barn or inclosure. This shifting-lever may have operating devices secured thereto for controlling the movement of the same and the parts actuated thereby at a distance from the barn or inclosure. Through the other slot in the end of the barn or inclosure, adjacent to the auxiliary bar 34, a link 39 is adapted to be passed, as shown by Fig. 3, and to this link a chain or like device 40 is secured and is supplied with a weight working in a box 41, similar to the constructions of a corresponding character heretofore set forth. The upper extremity of the chain or like device 40 is attached to one arm of a bell-crank lever 42, mounted on the inside of the barn or inclosure side close to the entrance-opening, and to the other arm of the said bell-crank lever 42 a chain 43 is movably attached and carries a pin 44 at its lower end. The entrance-opening to the barn or stable is closed by a spring-actuated automatically-opening gate or door 45, having a hasp or locking-bar 46 attached to the free side thereof and which is freely movable through an opening or slot 47 formed in the barn or stable side and a frame-post 48, the free extremity of the said locking-bar having a vertical opening therethrough to loosely receive the pin 44 and lock the door or gate 45 closed. When the link 39 is released, the chain 40, secured thereto, is pulled down by the weight in the box 41, and the tension on the said chain in the direction noted causes the adjacent arm of the bell-crank lever 42 to be also drawn down, and thereby an upward pull is exerted on the chain 43 to release the pin 44 from the locking-bar 46 and permit the gate or door 45 to fly open.

The extremity of the slide-bar 8, projecting through the side of the stable or inclosure opposite the location of the bell-crank lever 28, is movably connected to the upper end of a vertically-disposed lever 49, fulcrumed at a lower point on an outstanding fulcrum-bar 50. Above the fulcrum-bar 50 is a second fulcrum-bar 51, to which the angular portion 52 of a controlling-lever 53 is pivotally connected, the upwardly-extending short arm 54 of the said controlling-lever being attached to the lever 49 at the same point on the latter as where the extremity of the slide-bar 8 connects therewith. The controlling-lever 53 extends outwardly through an inclosure 55 to a vertically-disposed controlling-weight box 56 and is movably attached to the upper end of a controlling-weight 57, as clearly shown by Figs. 1 and 4. The said box 56 is firmly secured in the ground or otherwise anchored, and when the devices are set for operation the weight 57 normally rests at its lower end on a horizontal slide 58, having an inner segmentally-slotted edge 59, so that when the slide is drawn outwardly the weight 57 is permitted to fall, and thereby actuate all the set devices of the complete apparatus and release the same by pulling outwardly on the controlling-lever 53, it being understood that the said controlling-weight will be heavy enough to overcome any resistance that may be offered by the slide-bars carrying the hooks and insure a reliable operation. To the outer central portion of the edge of the slide 58 the lower arm of a bell-crank lever 60 is movably connected by a link 61, said bell-crank lever being fulcrumed on the lower end of a post 62 on one side of the box 56 and projecting above the upper end of the latter. On the upper extremity of the said post 62 another bell-crank lever 63 is fulcrumed and has its lower arm connected to the upper arm of the lower bell-crank lever 60 by a rod or analogous device 64, and to the upper arm of the lever 63 a pull-wire 65 is attached and extends over to one arm of a bell-crank lever 66 on a support near the free side of the gate or door 45, and from the same bell-crank arm another wire 67 extends away to any distance from the stable or inclosure for actuation by any one at a place remote from the stable or inclosure, and thereby provide for actuation of the mechanism for the purpose of release at different points without requiring the close approach of the operator to the stable or inclosure. A short pull-wire 68 is also attached to the remaining arm of the bell-crank lever 66 and hangs or is located near the manual shifting-lever 38 on the end of the auxiliary slide-bar 34, for a purpose that will be presently set forth. To an intermediate point in the wire 65 an auxiliary pull-wire 69 is attached and runs to a bell-crank lever 70, fulcrumed on the side of the stable or inclosure at which the controlling-weight and box therefor are located, and to another portion of said bell-crank lever 70 a locking-slide 71 is secured and is in the form of a drop-catch, the said device 71 being pivoted to the stable or inclosure near its rear end and adapted to fall into a notch 72, constructed in the adjacent upper edge portion of the slide-bar 8. When the apparatus is set, as shown by Fig. 1, the catch 71 is placed in engagement with the notch 72 to prevent accidental movement of the said apparatus from set condition and also prevents the controlling-weight from exerting its operating influence in the event of accidental displacement of said weight at a time when it is not desired to have the bars 8 and 34 moved to releasing position. When any of the pull-wires are operated to raise the catch 71 from the slide-bar 8, the controlling-weight is free to exert its force on the mechanism, and if an attendant is close to the stable or inclosure when it is desired to effect a release of the animals the short pull-wire 68 will be operated to release the catch 71. If the mechanism sticks at any time or fails to operate by reason of the controlling-weight failing to actuate the controlling-lever, the manual shifting-lever 38 can be readily employed for moving the slide-bars. It is also proposed to operate the slide-bars by electric attachments, water, compressed air, or any other power suitable for the purpose.

From the foregoing disclosure the general operation will be readily understood, and the advantages of the improved arrangement are obvious, and though the preferred form of the several parts of the apparatus have been shown and described changes in the form, size, proportions, and minor details may be resorted to without departing from the principle of the invention.

Having thus described the invention, what is claimed as new is—

1. A releasing device or apparatus of the character set forth, comprising a slide-bar with a plurality of hooks on the upper edge thereof and a notch in one extremity, a series of holding devices having terminal links adapted to be disposed in the path of movement of the said hooks and engaged by the latter, an automatically-operated gravitating controlling-weight normally supported at its lower end when the mechanism is set and attached to the notched extremity of the said slide-bar, and a drop-catch located over the said latter extremity of the said bar, said weight being located exteriorly of the inclosure having the slide-bar therein.

2. A releasing apparatus of the character set forth, comprising a longitudinally-movable slide-bar with a plurality of hooks on the upper edge thereof, a series of holding devices having terminal links adapted to be disposed in the path of and engaged by the said hooks, a gravitating controlling-weight connected to one end of the slide-bar, a permanently horizontally disposed movable slide on which the lower end of the weight normally rests to hold the bar in set condition, and means for releasing the weight.

3. A releasing apparatus of the class set forth, comprising a main slide-bar, an auxiliary slide-bar, said bars being movable exclusively in the direction of their lengths and both having a plurality of hooks on the upper edges thereof, closing and barrier devices for the structure in which the apparatus is located, a series of holding devices having terminal links adapted to be disposed in the path of and engaged by said hooks and arranged in operative relation to the said closing and barrier devices, and means for directly actuating the main slide-bar and through the latter the auxiliary bar to release the said holding devices.

4. In an apparatus of the character set forth, the combination with connected slide-bars having hooks thereon, holding devices, both bars exclusively having a longitudinal movement in planes at right angles to each other, of a controlling-weight attached to one extremity of one of the said bars, a permanently-horizontal slide for holding the weight elevated, and means for operating said slide.

5. In an apparatus of the character set forth, the combination with connected slide-bars having hooks thereon, holding devices, both bars exclusively having a longitudinal movement in planes at right angles to each other, of a controlling-weight attached to one extremity of one of the said bars, a movable device for holding the weight elevated, a locking-catch for engaging the extremity of the slide to which the weight is attached, and means for releasing said catch and moving the weight-holding device to permit the weight to fall.

6. In an apparatus of the character set forth, the combination with connected slide-bars having means for engaging and releasing holding devices, both bars exclusively having a longitudinal movement in planes at right angles to each other, holding devices having gravitating-weights attached to portions thereof, a main controlling-weight attached to one extremity of one of the said bars, and located exteriorly of the inclosure for said mechanism and means for releasing the said controlling-weight.

In testimony that I claim the foregoing as my own I have hereto affixed my signature in the presence of two witnesses.

JOHN J. LENTZ.

Witnesses:
WILLIAM BROWN,
RICHARD LAFAVRE.